United States Patent [19]

Okamoto

[11] Patent Number: 4,791,342

[45] Date of Patent: Dec. 13, 1988

[54] NUMERICAL CONTROL DEVICE

[75] Inventor: Takashi Okamoto, Hyogo, Japan

[73] Assignee: Mitsubishi Denki Kabushiki Kaisha, Tokyo, Japan

[21] Appl. No.: 63,946

[22] Filed: Jun. 19, 1987

[30] Foreign Application Priority Data

Jun. 19, 1986 [JP] Japan ............................... 61-143964

[51] Int. Cl.⁴ .............................................. G05B 19/10
[52] U.S. Cl. .................... 318/569; 318/600; 318/571; 364/167.01; 364/474.3
[58] Field of Search ...................... 318/569, 600, 571; 364/167

[56] References Cited

U.S. PATENT DOCUMENTS 4,550,375 10/1985 Sato et al. ........................... 364/474

Primary Examiner—William M. Shoop, Jr.
Assistant Examiner—M. Bergmann
Attorney, Agent, or Firm—Sughrue, Mion, Zinn, Macpeak, and Seas

[57] ABSTRACT

In a numerical control device for machine tools, a tool path is determined for a workpiece according to the machining data, and is divided into machining units, and the amount of machining for each machining unit is calculated to set a tool feeding speed data thereby to control the tool feeding speed of the machine tool.

8 Claims, 8 Drawing Sheets

PITCH FEED AMOUNT

PITCH FEED AMOUNT

PITCH FEED AMOUNT

NUMERICAL CONTROL DEVICE

BACKGROUND OF THE INVENTION

This invention relates to a numerical control device for controlling numerical control machine tools adapted to perform three-dimensional machining operations, and more particularly to a numerical control device for controlling the tool feeding speeds of such numerical control machine tools.

Interactive numerical control devices have been disclosed in Japanese patent application publication (OPI) No. 6784/1978 (corresponding to U.S. Pat. No. 4,477,754) (the term "OPI" as used herein means "an unexamined published application"), and U.S. Pat. No. 4,490,781. In the conventional interactive numerical control devices, as shown in FIG. 1, the operator 1 inputs a command for a tool feeding speed in an interactive mode, using a key board 3 and a display screen 4 on the front panel of the numerical control device 1, or the operator inputs such a command using a paper tape according to an expression method using word addresses (F codes). In this operation, the tool feeding speed is determined according to the operator's experience. When the tool feeding speed becomes unsuitable during machining, the operator 1 adjusts the speed manually with an override dial 5.

The above-described conventional numberical control devices are disadvantageous in the following respects: In the devices, even whenthe amount of machining per unitary length of a tool path is changed during machining, the tool feeding speed is maintained unchanged, and therefore the operator 1 must adjust the tool feeding speed using the override dial 5 during machining. If the amount of machining is very small, then it is difficult for the operator to adjust the tool feeding speed. For instance, in the case where the tool path, as shown in FIG. 4A, is of a pattern of "go" and "return" cutting, although the amount of machining 7 of the first machining unit 6a shown in FIGS. 5A and 6A is different from that of the second machining unit 6b shown in FIGS. 5B and 6B, the tool feeding speed is maintained unchanged. Therefore, the load applied to the tool in the former case is different from that applied to the tool in the latter case, with a result that the surface of the workpiece shows nonuniform finish. This will adversely affect the service life of the tool.

SUMMARY OF THE INVENTION

In view of the foregoing, an object of this invention is to provide a numerical control device which, when the amount of machining per a unitary length of a tool path changes during machining, can automatically adjust the tool feeding speed according to the change.

The foregoing object and other objects of the invention are accomplished by the provision of a numerical control device for controlling numerical control machine tools adapted to perform three-dimensional machining operations, which, according to the invention, comprises: machining-locus calculating means for determining a tool path according to machining data such as machining dimensions; machining-unit forming means for dividing the tool path into machining units; machining-amount calculating means for calculating the amount of machining of a workpiece for each of the machining units of the tool path; speed parameter setting means for setting a tool feeding speed parameter according to the amount of machining thus calculated; and tool feeding speed calculating means for controlling a tool feeding speed according to the tool feeding speed parameter thus set.

The nature, principle and utility of the invention will become more apparent from the following detailed description when read in conjunction with the accompanying drawings.

DETAILED DESCRIPTION OF THE PREFERRED EMBODIMENTS

One preferred embodiment of a numerical control device according to this invention will be described with reference to FIGS. 2 through 6.

Figure 1:
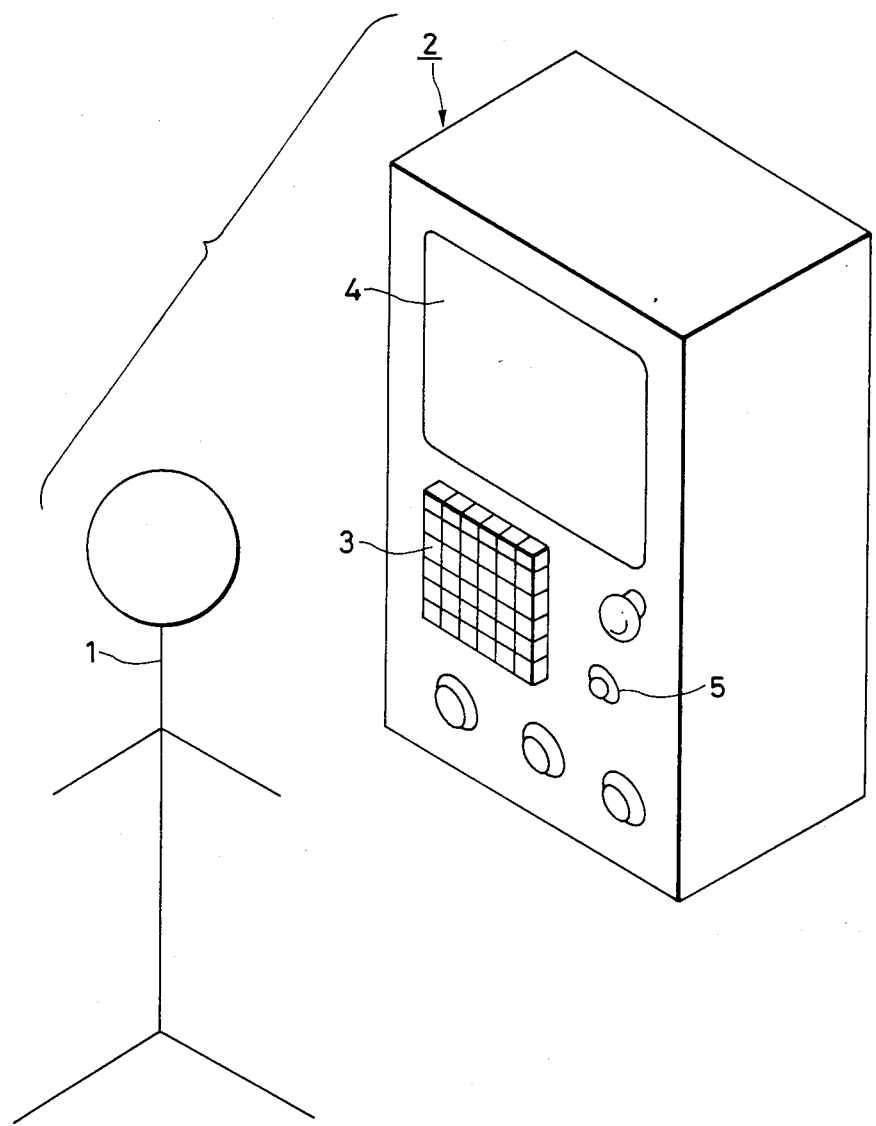
FIG. 1 is an explanatory diagram showing a conventional interactive numerical control device.
Figure 2:
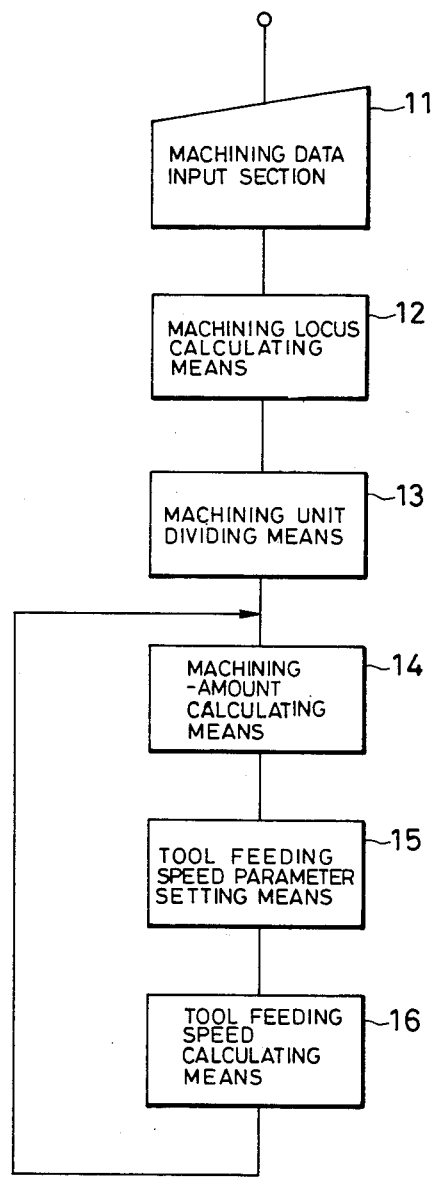
FIG. 2 is a block diagram showing the arrangement of one example of a numerical control device according to this invention.

First, the arrangement of the numerical control device will be described with reference to FIG. 2. In FIG. 2, reference numeral 2 designates a machining data input section for inputting machining data of machining dimensions, the material of a workpiece, tools and so forth, these data being inputted by the operator or set automatically by the numerical control device; 12, machining locus calculating means for determining a tool path which is obtained by shifting machining dimensions as much as the radius of a tool which are inputted at the machining data input section 11; 13, machining unit forming means for dividing a tool path 6 (FIG. 4A) determined by the maching locus calculating means 12 into machining units 6a through 6n (FIGS. 4B and 4C) for instruction of tool feeding speeds; 14, machining-amount calculating means for calculating the amount of machining 7 or 8 (FIGS. 6A, 6B or 6C, 6D) or the like of a workpiece 9 for each of the machining units 6a through 6n of the tool path 6; and 15, speed parameter setting means for setting a tool feeding speed parameter according to the amount of machining 7 or 8 or the like which have been calculated by the machining-amount calculating means 14. In the speed parameter setting means 15, for instance in the case where a pitch feed A (FIG. 4A or FIG. 5B) is constant, the amount of machining for the first machining unit 6a occurring immediately after an initial operation 60 in which the tool is infeeded is made different from the amount of machining for the remaining machining units 6b through 6n; that is, a tool feeding speed parameter for the first machining unit is set large while that for the remaining machining units small.

Further in FIG. 2, reference numeral 16 designates tool feeding speed calculating means for calculating a suitable tool feeding speed according to the tool feeding speed parameters thus set, and data on the material of the workpiece 9, and a tool 10 to be used. For the tool feeding speed calculating means, a table of these data has been stored in a memory provided in the numerical control device, so that when tool feeding speed parameters, the material of a workpiece and a tool to be used are determined, the concerned tool feeding speed can be read out of the table.

Figure 3:
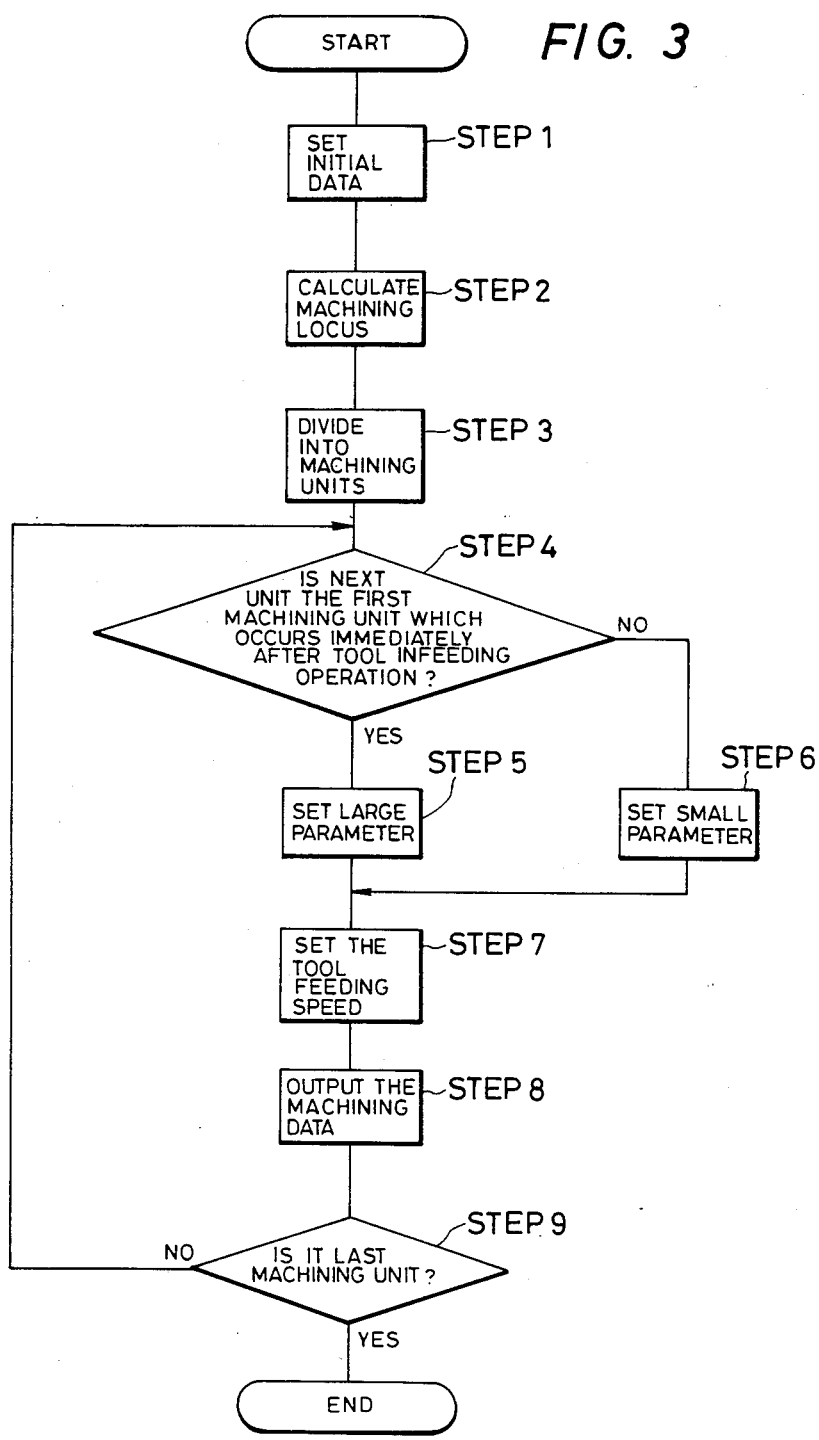
FIG. 3 is a flow chart for a description of the opertion of the numerical control device according to the invention.

The operation of the numerical control device thus organized will be described with reference to a flow chart of FIG. 3.

Figure 4A:
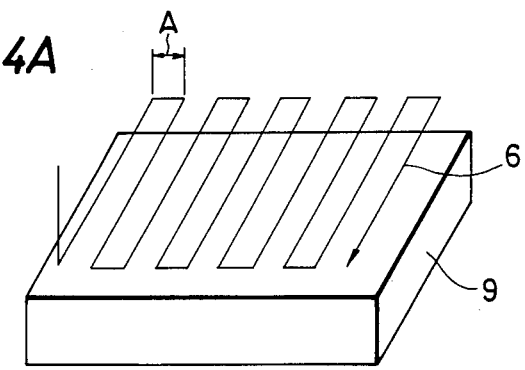
FIG. 4A is an explanatory diagram showing one example of a tool path.
Figure 4B:
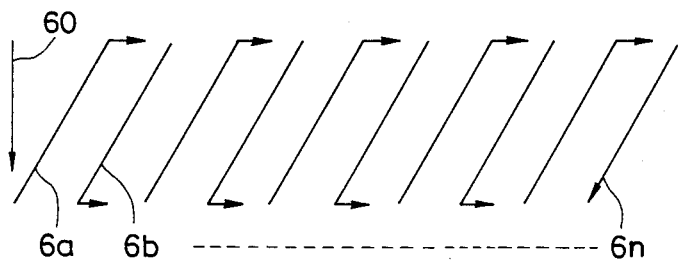
FIGS. 4B and 4C are explanatory diagrams showing examples of a method of dividing the tool path into machining units.
Figure 4C:
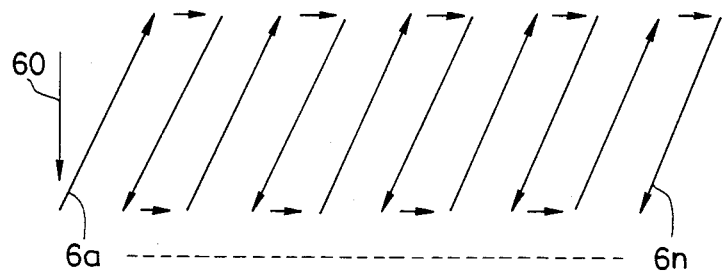
Figure 5A:
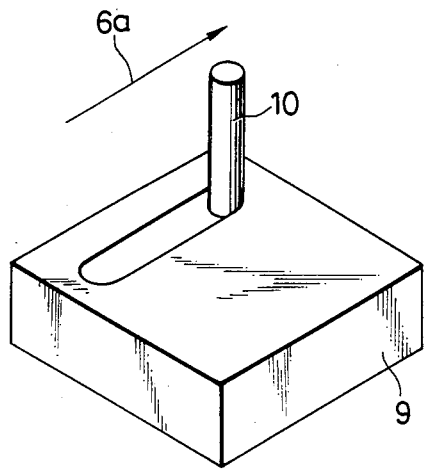
FIGS. 5A and 5B are explanatory diagrams showing the machining unit which occurs in the tool path immediately after a tool infeeding operation, and the following machining unit.
Figure 5B:
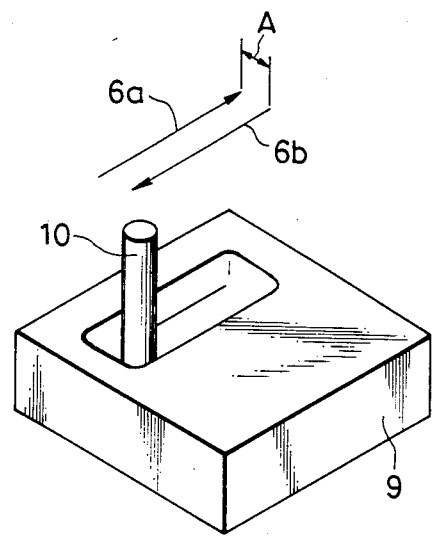
Figure 6A:
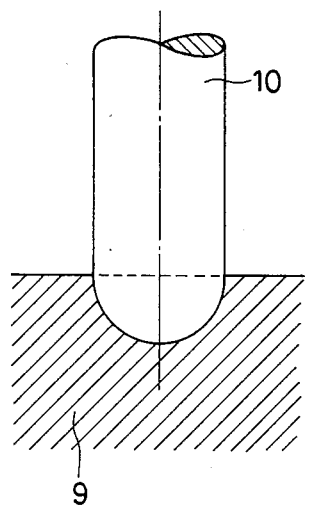
FIGS. 6A and 6B and 6C are sectional views showing the amount of machining in FIGS. 5A and 5B respectively.
Figure 6C:
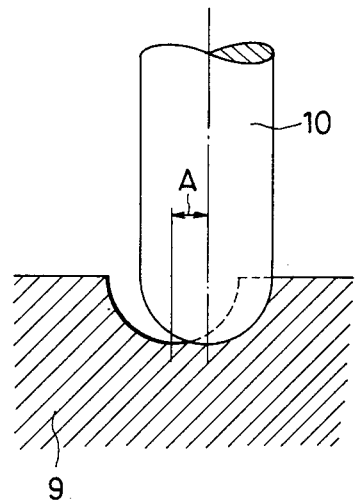
Figure 6B:
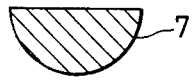
Figure 6D:
Figure 7:
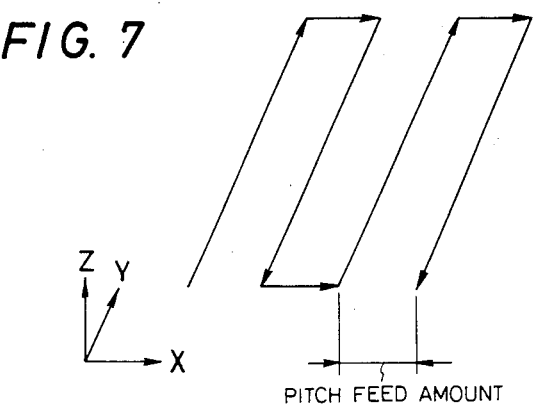
FIGS. 7, 7A through 7D, 8 through 11 and 12A and 12B are explanatory diagrams for a description of various examples of a method of determining a tool feeding speed parameter for the numerical control device according to the invention.
Figure 7A:
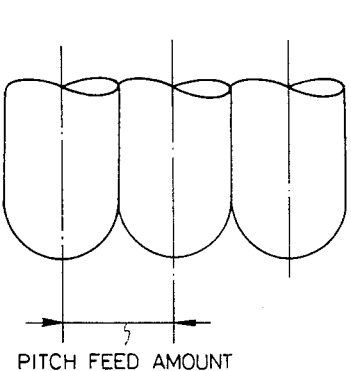
Figure 7B:
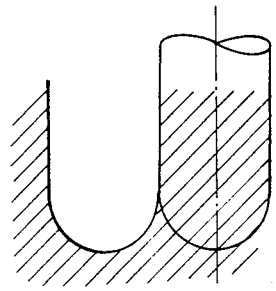
Figure 7C:
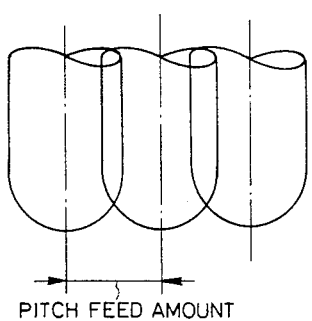
Figure 7D:
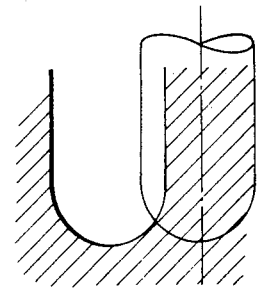

First, an initial data setting operation is carried out to input data necessary for machining (Step 1); that is, machining dimension, the material of a workpiece 9, and a tool 10 to be used are determined. Then, a tool path 6 is formed according to the machining dimensions as shown in FIG. 4A (Step 2), and the tool path 6 thus formed is divided into machininig units 6a through 6n as shown in FIG. 4B (Step 3). Thereafter, it is determined whether or not the first machining unit 6a which occurs immediately after a tool infeeding operation 60 is selected (Step 4). If the first machining unit 6a is selected, then the tool feeding speed parameter is set large (Step 5). If any one of the remaining machining units 6b through 6n is selected, then the tool feeding speed parameter is set small (Step 6). Under this condition, a tool feeding speed is set according to the tool feeding speed parameter thus set, and the data on the material of the workpiece 9 and the tool 10 to be used (Step 7), and data for machining the machining unit thus selected are transmitted to the machine tool (Step 8). Thereafter, it is determined whether or not the last machining unit 6n is selected (Step 9). If not, the operation of Step 4 is effected again. If it is determined that the last machining unit 6n has been selected, then the operation of the numerical control device is suspended.

As is apparent from the above description, with the numerical control device of the invention, even when the aounts of machining for the machining units of the tool path are different, tool feeding speeds suitable for the machining units can be provided, with the result that the surface of the workpiece is finished fine.

In the above-described embodiment of the invention, the amount of machining for the first machining unit 6a occurring immediately after the tool infeeding operation 60 is made different from that for the remaining machining units 6b through 6n, and the tool feeding speed parameters are set according to these amounts of machining. However, the same effects can be obtained by setting the tool feeding speed parameters according to the pitch feed A, and the volume, weight, depth, surface area and sectional area of a machining part at each machining unit.

Now, a variety of methods of setting tool feeding speed parameters will be described.

(1) A method of setting tool feeding speed parameters according to a pitch feed:

For instance where, as shown in FIGS. 7 and 7A–7D, cutting is carried out in parallel with the axial direction, a tool feeding speed parameter (hereinafter referred to as "TP") is determined as follows:

TP = (pitch feed)/(tool diameter)

When TP is one (1) or larger, it is determined that a 100% load is applied to the tool, and a tool feeding speed FO is outputted. And when TP is smaller than one (1), a tool feeding speed (FO×TP) is outputted.

Figure 8:
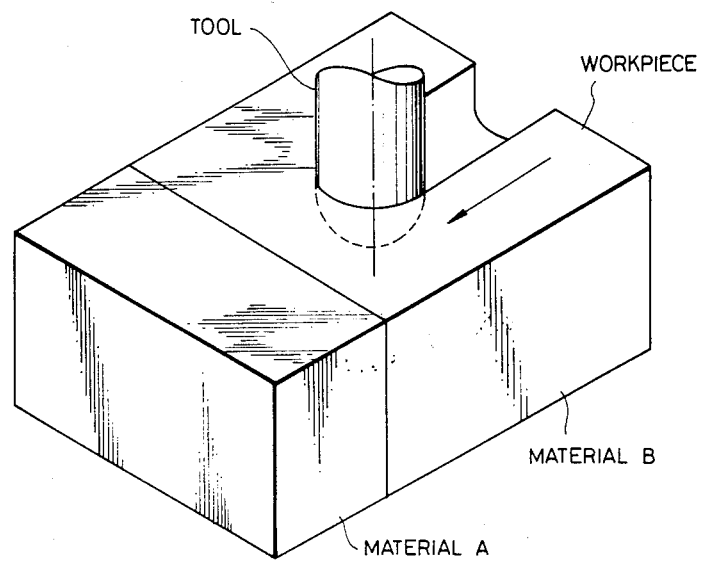

(2) A method of setting tool feeding speed parameters according to the hardness of a machining part at each machining unit:

In the case where, as shown in FIG. 8, the tool must pass through different materials A and B, the reciprocal of the shearing strength of each material is employed as a tool feeding speed parameter, and a tool feeding speed is determined according to the tool feeding speed parameter. That is, the tool feeding speed parameter is small for a hard material, and large for a soft material.

Figure 9:
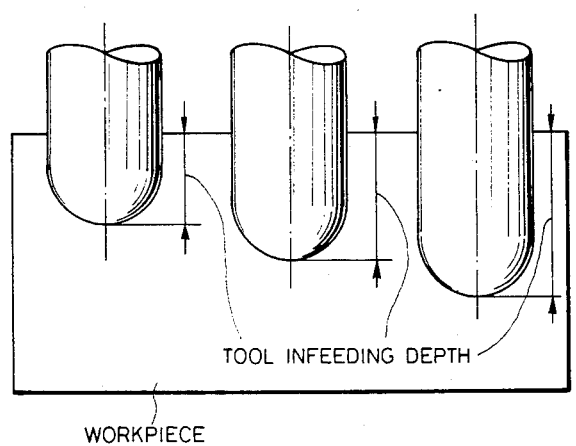

(3) A method of setting a tool feeding speed parameter according to the depth of a machining part at each machininig unit:

In the case where, as shown in FIG. 9, tool infeeding depths are different, tool feeding speed parameters can be determined from the tool infeeding depths.

Figure 10:
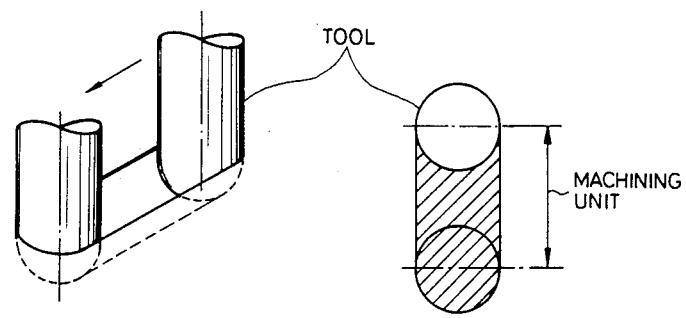

(4) A method of setting a tool feeding speed parameter according to the surface area of a machining part at each machining unit:

As shown in FIG. 10, the surface area of a machining part at each machining unit is calculated using data such as the radius of a tool to be used and a pitch feed. The ratio of the surface area thus calculated to a predetermined reference value is employed as TP, and the product of the TP and the tool feeding speed for the reference value is employed as the aimed tool feeding speed.

For instance when the machining unit is 1 mm and the radius of the tool is 5 mm, the machined surface area is 10 mm$^2$ (=1 mm×5 mm×2). This surface area can be employed as the tool feeding speed parameter.

Figure 11:
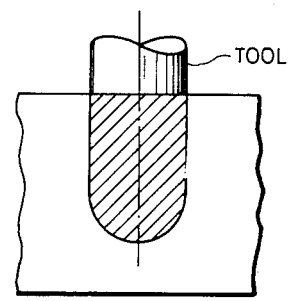

(5) A method of determining a tool feeding speed parameter according to the sectional area of a machining part at each machining unit:

As shown in FIG. 11, the sectional area of a machining part at each machining unit is calculated using data on the configuration (radius) of a tool to be used, a pitch feed, an infeed, and the thickness of a workpiece. The ratio of the sectional area thus calculated to a predetermined reference value is employed as TP, and the product of the TP and the tool feeding speed FO for the reference value is used as the aimed tool feeding speed.

For instance where a workpiece is machined horizontally with a ball end mill 5 mm in radius, and the latter is infeeded 20 mm, the sectional area of the machining part is 189.25 mm$^2$ (=$\pi$×5 mm×5 mm/2+(20 mm−5 mm)×5 mm×2). This sectional area can be employed as the tool feeding speed parameter.

Figure 12A:
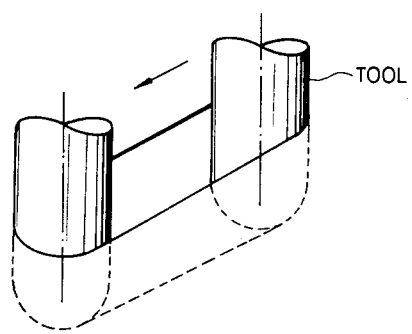
Figure 12B:
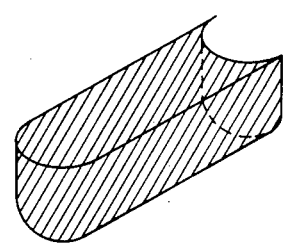

(6) A method of determining a tool feeding speed parameter according to the volume of a machining part at each machining unit:

As shown in FIGS. 12A, 12B, the volume of a machining part at each machining unit is calculated using data on the configuration (radius) of a tool, an infeed, a pick feed and the thickness of a workpiece. The ratio of the volume thus calculated to a predetermined reference value is determined as TP, so that the product of the TP and the tool feeding speed FO for the reference value is used as the aimed tool feeding speed.

For instance in the case where the machining unit is 1 mm, an infeed is 5 mm, and a flat end mill 5 mm in radius is used, the volume cut out while the tool is moved 1 mm, the machining unit, is 50 mm$^3$ (=1 mm×5 mm×2×5 mm). This volume can be employed as the tool feeding speed parameter.

When a ball end mill or special tool whose configuration is variable in the Z-direction is used, the volume cut out changes nonlinearly with the amount of infeed in the Z-direction. Therefore, in this case, the volume can be used as the tool feeding speed parameter.

The numerical control device of the invention has been described with reference to the cutting operation. However, it is obvious that the numerical control device can be applied to other special machining operations such as for instance discharge machining operations with the same effects.

As was described above, in the numerical control device of the invention, the tool feeding speed is controlled according to the amount of machining provided for the machining units of a tool path. Therefore, even in the machining operation in which the amount of machining per unitary length of a tool path is not constant, the surface of the workpiece is finished fine, and the service life of the tool is lengthened.

What is claimed is:

1. A numerical control device for controlling numerical control machine tools adapted to perform three-dimensional machining operations, which comprises:
   machining-locus calculating means for determining a tool path according to machining data such as machining dimensions;
   machining-unit forming means for dividing said tool path thus determined into machining units;
   machining-amount calculating means for calculating the amount of machining of a workpiece for each of said machining units of said tool path;
   speed parameter setting means for setting a tool feeding speed parameter according to said amount of machining thus calculated or the like; and
   tool feeding speed calculating means for controlling a tool feeding speed according to said tool feeding speed parameter thus set.

2. A numerical control device for controlling numerical control machine tools adapted to perform three-dimensional machining operations, which comprises:
   machining-locus calculating means for determining a tool path according to machining data such as machining dimensions;
   machining-unit forming means for dividing said tool path thus determined into machining units;
   machining-amount calculating means for calculating the amount of machining of a workpiece for each of said machining units of said tool path;
   speed parameter setting means for setting a tool feeding speed parameter according to said amount of machining thus calculated or the like; and
   tool feeding speed calculating means for controlling a tool feeding speed according to said tool feeding speed parameter thus set, wherein a tool feeding speed parameter for the machining unit which occurs in said tool path immediately after a tool in feeding operation is made different from that for the remaining machining units.

3. The numerical control device as claimed in claim 1, wherein said speed parameter setting means comprised a means for setting said tool feeding speed parameter in response to a pitch signal of said tool path.

4. The numerical control device as claimed in claim 1, wherein said speed parameter setting means comprises a means for setting said tool feeding speed parameter in response to the hardness of a machining part at each machining unit.

5. The numerical control device as claimed in claim 1, wherein said speed parameter setting means comprises a means for setting said tool feeding speed parameter in response to the depth of a machining part at each machining unit.

6. The numerical control device as claimed in claim 1, wherein said speed parameter setting means comprises a means for setting said tool feeding speed parameter in response to the surface area of a machining part at each machining unit.

7. The numerical control device as claimed in claim 1, wherein said speed parameter setting means comprises a means for setting said tool feeding speed parameter in response to the sectional area of a machining part at each machining unit.

8. The numerical control device as claimed in claim 1, wherein said speed parameter setting means comprises a means for setting said tool feeding speed parameter in response to the volume of a machining part at each machining unit.

* * * * *